(12) United States Patent
Hastings et al.

(10) Patent No.: US 7,820,054 B2
(45) Date of Patent: Oct. 26, 2010

(54) METHOD FOR DEWATERING SLURRY FROM CONSTRUCTION SITES

(75) Inventors: Denny Hastings, Shelbyville, TN (US); Kyle Seagroves, Shelbyville, TN (US); Stephen M. Sliger, Shelbyville, TN (US)

(73) Assignee: Denny Hastings FLP 14, Shelbyville, TN (US)

( * ) Notice: Subject to any disclaimer, the term of this patent is extended or adjusted under 35 U.S.C. 154(b) by 96 days.

(21) Appl. No.: 12/319,764

(22) Filed: Jan. 12, 2009

(65) Prior Publication Data

US 2009/0178979 A1 Jul. 16, 2009

Related U.S. Application Data

(60) Provisional application No. 61/011,075, filed on Jan. 14, 2008.

(51) Int. Cl.
*B01D 36/04* (2006.01)
(52) U.S. Cl. .................. 210/702; 210/747; 210/804; 210/155; 210/162; 210/170.01; 210/305; 210/532.1; 405/39; 405/45; 405/74; 405/119
(58) Field of Classification Search .............. 210/702, 210/747, 800, 804, 155, 162, 170.01, 170.03, 210/282, 305, 521, 532.1; 405/36, 39, 45, 405/50, 74, 119, 120, 302.6, 302.7
See application file for complete search history.

(56) References Cited

U.S. PATENT DOCUMENTS

| | | |
|---|---|---|
| 3,396,545 A | 8/1968 | Lamberton |
| 3,860,526 A | 1/1975 | Corbett |
| 3,985,651 A | 10/1976 | Newman |
| 4,631,066 A | 12/1986 | Minemura et al. |
| 4,650,368 A | 3/1987 | Bayer |
| 4,889,446 A | 12/1989 | Holmberg |
| 5,015,123 A | 5/1991 | Houck et al. |
| 5,154,543 A | 10/1992 | Houck et al. |
| 5,158,395 A | 10/1992 | Holmberg |
| 5,338,131 A | 8/1994 | Bestmann |
| 5,429,450 A | 7/1995 | Meidinger |
| 5,505,557 A | 4/1996 | Bradley |
| 5,669,732 A | 9/1997 | Truitt |
| 5,678,954 A | 10/1997 | Bestmann |
| 5,815,853 A | 10/1998 | Chase |
| 5,902,070 A | 5/1999 | Bradley |
| 5,951,202 A | 9/1999 | Brown |
| 5,967,965 A | 10/1999 | Vyshkina et al. |
| 6,109,835 A | 8/2000 | Grabhorn |
| 6,143,047 A | 11/2000 | Jodoin et al. |
| 6,206,098 B1 | 3/2001 | Cooper et al. |
| 6,315,493 B2 | 11/2001 | Malone et al. |
| 6,342,456 B1 | 1/2002 | Jenkins et al. |
| 6,443,652 B1 | 9/2002 | Houck et al. |

(Continued)

OTHER PUBLICATIONS

Int'l Search Report for PCT US/07/13343, Jan. 24, 2008, Denny Hastings.

*Primary Examiner*—Christopher Upton
(74) *Attorney, Agent, or Firm*—McNair Law Firm, P.A.; William D. Lee, Jr.

(57) ABSTRACT

A method of removing solids from the slurry at a construction site located on or near a stream in order to improve the quality of water discharged into the stream by forming treatment zones for receiving slurry, said zones comprising walls of filter bags and floors of filter skirts, said bags and skirts comprising geotextile material and the bags being filled with a shredded rubber and woodchip combination.

3 Claims, 2 Drawing Sheets

U.S. PATENT DOCUMENTS

| | | |
|---|---|---|
| 6,464,428 B1 | 10/2002 | Mikell |
| 6,464,862 B2 * | 10/2002 | Bennett ..................... 210/155 |
| 6,547,493 B2 | 4/2003 | Spangler et al. |
| 6,709,202 B2 | 3/2004 | Spangler et al. |
| 6,733,209 B2 | 5/2004 | Allard |
| 6,749,748 B1 | 6/2004 | Macpherson et al. |
| 6,910,835 B2 | 6/2005 | Spangler et al. |
| 6,913,423 B2 | 7/2005 | Spangler et al. |
| 6,988,852 B2 | 1/2006 | Bussey et al. |
| 7,021,869 B2 | 4/2006 | Sanguinetti |
| 7,052,206 B1 * | 5/2006 | Mastromonaco ............. 405/39 |
| 7,178,224 B2 | 2/2007 | Bussey et al. |
| 7,226,240 B2 | 6/2007 | Tyler |
| 7,303,670 B2 | 12/2007 | McPhillips |
| 7,449,105 B2 | 11/2008 | Hastings |
| 7,559,113 B1 * | 7/2009 | DiCarlo et al. ......... 210/170.01 |
| 2004/0133176 A1 | 7/2004 | Muthiah et al. |
| 2006/0060512 A1 | 3/2006 | Astle et al. |

\* cited by examiner

METHOD FOR DEWATERING SLURRY FROM CONSTRUCTION SITES

CROSS REFERENCE TO RELATED APPLICATION

This application claims priority from Provisional Application Serial No. 61/011,075, filed Jan. 14, 2008.

FIELD OF THE INVENTION

This invention relates to erosion control and more particularly to controlling the quality of water at construction sites near streams.

SUBJECT MATTER INCORPORATED BY REFERENCE

The specification and drawings of U.S. Pat. No. 7,449,105 which issued Nov. 11, 2008 and which is owned by the assignee of this application is incorporated herein by reference.

BACKGROUND

Construction projects that require installations across streams and other water resources are inherently problematic relative to issues of surface-water quality. Proper protocols must be followed for handling in-stream construction work to prevent suspended-solids release into the water body. This often involves the temporary isolation of the proposed crossing location by creating temporary dams immediately upstream and downstream of the construction crossing. These temporary isolation dams are typically constructed out of sand bags to create a relatively "clean" temporary barrier for flow. Once these barriers are in place, pumps or diversion channels can be installed to divert stream flow around the construction crossing location. When this bypass is in place, the construction at the crossing can take place. However, construction will usually create a suspended-solids slurry that must be evacuated from the crossing location in order to provide a dry, stable foundation for construction. The slurry is pumped out of the crossing pit and discharged away from the crossing location. This slurry can be a highly concentrated suspended-solids solution that will require treatment before it is discharged back into the stream. Conventional treatment approaches include using bags as filters. These bags may be constructed of porous material such as burlap or woven plastic material and are designed to be filled with a ballast such as sand, gravel, or wood chips so that the bags, when in place, may be filled further with the slurry/water mixture so that it slowly "bleeds" out or flows through the porous material, resulting in some degree of filtration and collection of solids onto the bag surface. These bags often clog very easily and are marginally successful in solids reduction with little removal of fine, colloidal solids associated with many clay soils. Accordingly, one of the objects of this invention is to provide a method and flow control system that improves the quality of water discharged into streams at construction sites by reducing the quantity of solids in the water. This is a dewatering process where high purity water is removed from the solids in a slurry.

SUMMARY OF THE INVENTION

The objects of the present invention are achieved by the following described system. The system incorporates a synergistic approach utilizing two products: the first being a highly durable, reusable sediment-retention sieve type filter bag manufactured with an external woven monofilament geotextile (with UV-inhibiting carbon black) of the type described in the aforementioned U.S. Pat. No. 7,449,005 and sold under the brand name, EROSION EEL®, and which may be filled with a combination of washed, shredded rubber from recycled used tires and AASHTO-certified hardwood chips. The shredded rubber is a preferred filler that can be used alone or advantageously in combination with other approved fillers such as the aforementioned wood chips. The preferred filter bag has a nominal diameter of about 241 millimeters (9.5 inches) and a manufactured length from about 3 meters (10 ft.) to about 1.37 meters (4.5 ft.). This material combination has proven to be very effective in both laboratory and field applications. Like a silt fence, the filter bag can be applied to intercept sheet-flow runoff by installing the sieves perpendicular to the direction of flow along sloped surfaces. Unlike a silt fence, these special filter bags can also be placed within concentrated flow paths to act as a check dam. They can also be used to direct flow as a temporary diversion berm.

The second product is a new filter skirt material comprising of natural and synthetic fibrous matting impregnated with polymeric compounds that promotes flocculation of suspended soil particles to enhance settling rates and adsorption onto the surface area of the fiber matting and is sold under the brand name FlocMat™. The unique combination of the bag and skirt to form filter zones can result in removing substantially all solids from slurry passing therethrough.

Accordingly, in one aspect, the present invention is a method for dewatering slurry from construction sites at temporary stream crossings comprising the steps of forming a channel, the walls of said channel comprising stacked filter bags as described above; lining the floor of the channel with the filter skirt material also described above; providing spaced apart baffles comprising filter bags across said channel disposed substantially perpendicular to the channel walls; placing a stack of filter bags at one end of the channel to diffuse the discharge of slurry that is pumped into said channel, and providing a closure dam at the other end of said channel to form a treatment zone before water filtered from said slurry is released.

In another aspect the invention is a treatment system that involves channeling the pump effluent at a construction site through a wide and long pre-fabricated channel. The sides of the pre-fabricated channel are formed using the filter bags filled with recycled (chopped or shredded) rubber and hardwood chip filter media. Shredded rubber, particularly, tends to remain in the ballast as discrete particulate and does not tend to form "clogs" as silt accumulates so that its effectiveness as a filtering medium is not significantly diminished over time.

The discharge from the pump hose is positioned to flow over a series of stacked filter bags in order to dissipate hydraulic energy and prevent soil scour at the hose outlet. From the pump discharge hose, flow moves as sheet flow via gravity through the pre-fabricated channel across a series of baffles consisting of stacked filter bags placed perpendicular to flow across the entire width of the channel, the positioning of the channel having been selected to promote gravity flow. The baffles are constructed by placing two filter bags side-by-side forming the base and placing a third filter bag on top. A series of one to five filter bag baffles may be used in a primary treatment zone. A secondary treatment zone (a settling zone) is provided below the primary pre-fabricated treatment channel. The settling zone is developed by installing a vertical-stacked filter bag baffle/check dam. Iron posts are positioned at the front and rear of the baffle/check dam to keep the vertical stack tightly in place. A layer of polymer-impregnated fiber, the filler skirt, is placed across the entire channel floor. The preferred polymer is polyacrylamide or PAM

DESCRIPTION OF THE DRAWINGS

In the drawings which are appended hereto and made a part of this disclosure by way of illustration and not limitation.

DETAILED DESCRIPTION

Figure 1:
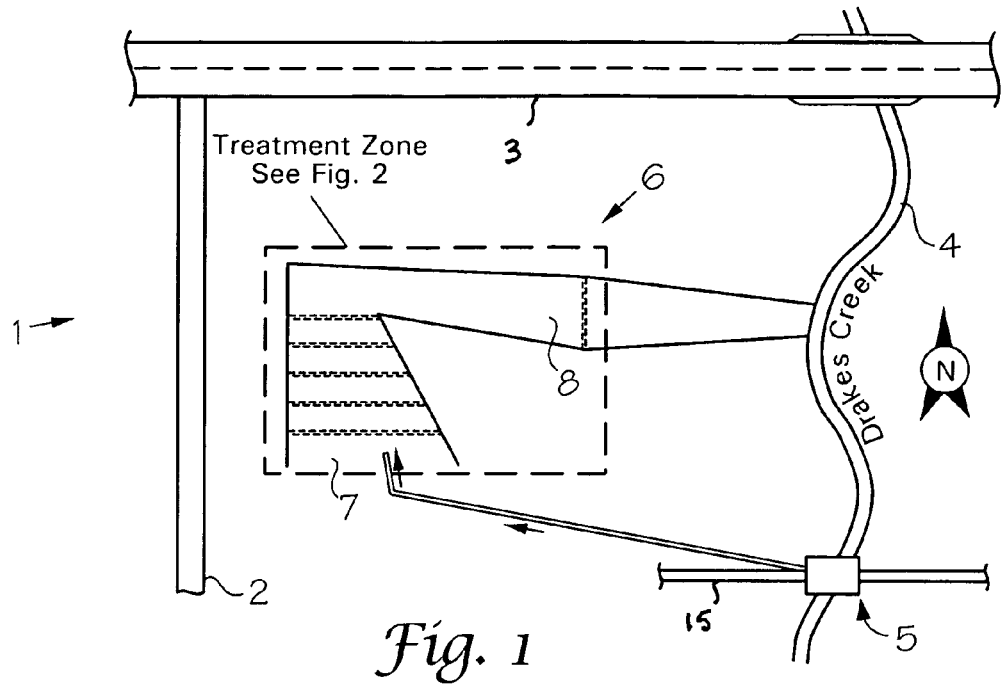
FIG. 1 is a layout of a construction site for a pipeline crossing of a stream having dewatering pumps, baffles, treatment zones and flow discharge.
Figure 2:
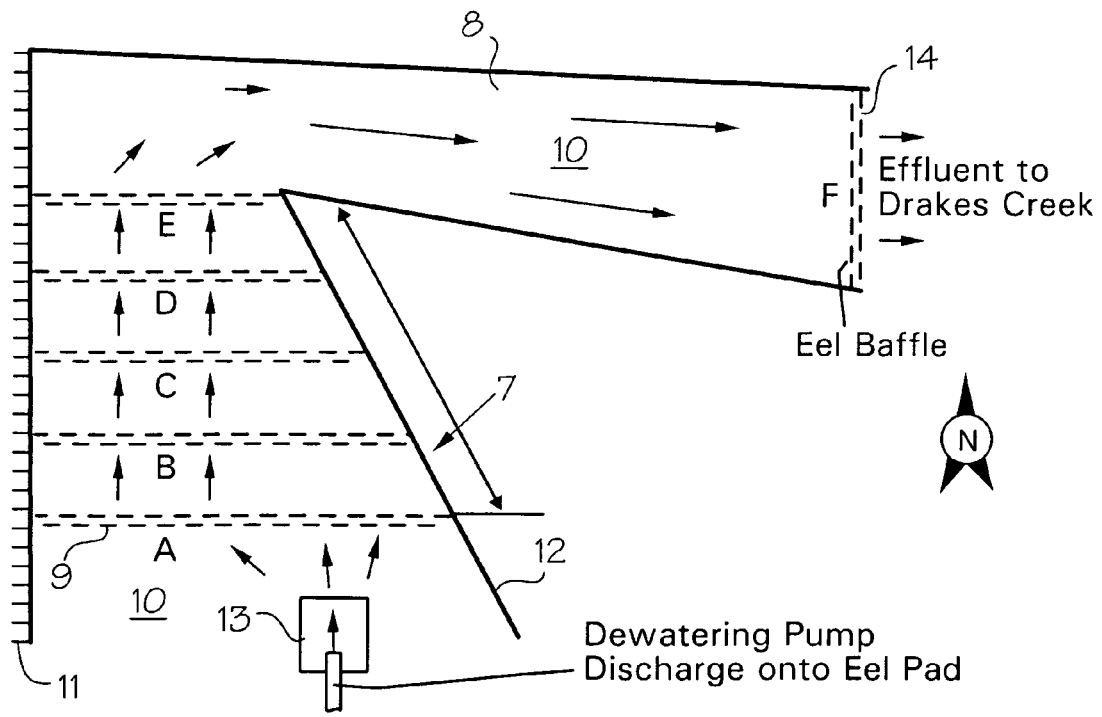
FIG. 2 is plan view of an enlarged section of the layout of FIG. 1 showing in greater detail the flow of water through the primary treatment zone and through the second treatment or setting zone before discharge; and, FIG. 3 is a cross-section through the primary treatment zone showing the baffles created by stacked bags.

Looking at FIGS. 1 and 2, construction site 1 is shown bounded by a temporary construction road 2, State Road 3, and creek 4 over which pipeline crossing 5 is being constructed. Water flow is indicated by the arrows in FIG. 2. Treatment zone 6 comprises primary zone 7 and secondary zone 8. Baffles 9(A-E) are arranged in parallel rows in zone 7 between baffle walls 11 and 12. The floor 10 of the primary zone 7 comprises filter skirt 10. The primary zone 7 receives the flow from pump 13 from which the slurry flows through the baffles 9(A-E) as it is being de-watered and then into the second zone 8 through interface or connecting baffle 9E. The treated water exits secondary zone 8, which also has a filter skirt floor 10, through end baffle 14 which serves as a fluid filter dam. Water flow in FIGS. 1 and 2 is indicated by the arrows. The stacking of filter bags 16 to form baffles 9 is shown in cross-section in FIG. 3 which is a cross-section of zone 7.

Figure 3:
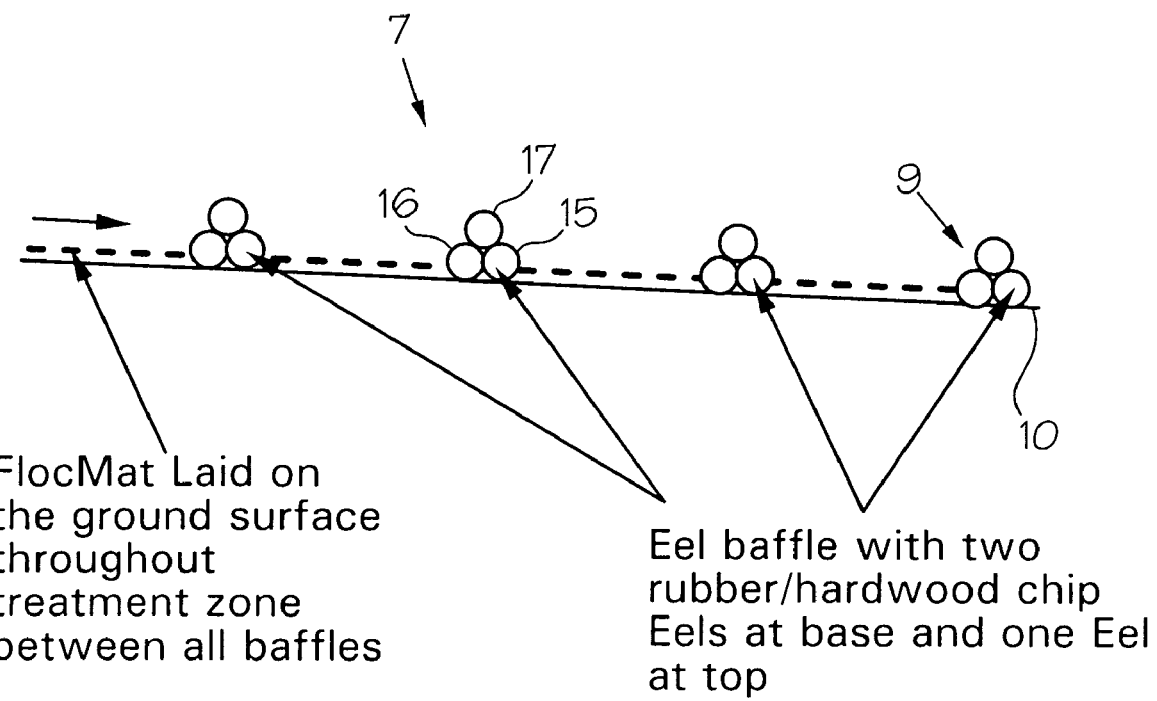

The foregoing arrangement shown in FIGS. 1, 2, and 3 is a preferred embodiment and best mode of the invention and illustrates the construction and operation of an in-field treatment system for dewatering slurry pumped out of a pipeline stream crossing. An embodiment of this type was used at Drakes Creek, Tenn. with temporary dams upstream and downstream from the pipeline crossing 5. The dimensions of the primary treatment zone 7 were approximately 760 meters (250 ft.) in length with an average width of 9 meters (30 ft.). The secondary treatment zone 8 had a length of about 30 meters (100 ft.) from the discharge end of zone 7. Water trapped in the trench in which pipe 15 is located in construction zone 1 was evacuated primarily by means of one 1500 gpm pump 13. During the fifth day of pumping, two 1500 gpm pumps were used to pump flow through the system. The evacuation of this trapped water/slurry continued simultaneously with the trench excavation, producing a highly turbid water slurry of heavy silt and clay solids. The system of the present invention which was used to treat and dewater the slurry is a synergistic approach incorporating two products: 1) the filter bag sold as the Erosion Eel® and a filter skirt sold as FlocMat™. The results from this installation revealed a minimum 97% reduction in turbidity from water exiting baffle 14 when comparing the influent from the pump evacuating a dewatering pit at the stream crossing 5 of Drakes Creek. An initial influent total solids sample yielded 16,000 mg/L suspended solids concentration in pump 13 discharge. Later, in the pumping and dewatering process, a second influent sample was taken at pump 13 and laboratory analysis of the sample yielded 56,000 mg/L suspended solids concentration. A total of four effluent samples were taken throughout the process below the final baffle 14 of the treatment configuration. The effluent total solids results were 24 mg/L, 20 mg/L, 15 mg/L, and 15 mg/L. Using the average of 18.5 mg/L for the effluent concentration, the maximum total solids reduction by the proprietary treatment system was 99.97% or substantially all. Based on the depth of new soil settled along the bottom of the primary treatment zone, it is estimated that the system removed over 45,000 kg (>30 tons) of soil. The field test results demonstrate that the treatment system according to the invention is highly effective in reducing the concentration of suspended solids in the water that is discharged back into the environment. The system is not only effective, but can be readily set up and operated in a relatively short period of time.

While one preferred embodiment has been described above, other embodiments may become apparent to those skilled in the art upon reading and studying the foregoing disclosure. However, the invention is limited only by the claims that follow.

What is claimed is:

1. A method for dewatering slurry that contains soil as it is removed from a construction site comprising the steps of:
   a) forming first and second treatment zones comprising walls of filter bags and floors of filter skirts, said first zone having a series of baffles disposed therein, said zones being so arranged that water discharged over or through an entrance baffle can flow into the first zone, through or over the baffle in the first zone and can flow into the second zone through or over a connecting baffle; said second zone having a discharged baffle from which water can exit; said baffles in said first zone being spaced apart and comprising filter bags, said baffles extending across said first zone so that the direction of the flow of water and slurry through the zone will be substantially perpendicular to the baffles;
   b) discharging slurry to be dewatered into said first zone so that it passes across and through said first zone baffles, over and through a connecting baffle that is an interface between the first and second zone, and flows into the second zone; and,
   c) discharging water from the second zone after it has traversed the second zone, solids having been substantially removed from the water.

2. The process of claim 1 wherein the filter bags walls comprise woven plastic material which includes a UV inhibitor and the bags are filled with ballast comprising chapped or shredded rubber; and the skirt comprises a woven plastic material and includes a flocculant.

3. At a construction site, a treatment system for dewatering slurry removed from the site comprising:
   a) a first zone for receiving slurry directly removed from the site, said first zone comprising a channel having walls of filter bags and a floor comprising a filter skirt;
   b) a series of spaced apart, parallel baffles located in the first zone and positioned across said channel, said baffles being lengthwise perpendicular to said walls, said baffles comprising filter bags; and
   c) a second zone for receiving a water/slurry mixture from the first zone through a connecting interface baffle that is common to both the first and second zones, said second zone having walls formed from filter bags and filter skirt forming a floor, said second zone having a discharge baffle spaced apart from the connecting baffle which closes the second zone whereby water/slurry entering through said connecting baffle traverses the second zone and exits through the discharge baffle as purified water.

* * * * *